United States Patent
Wunsche, III et al.

(10) Patent No.: US 11,662,217 B2
(45) Date of Patent: May 30, 2023

(54) PREDICTIVE CLEANLINESS FUNCTION FOR VEHICLE-SHARING FLEET

(71) Applicants: DENSO International America, Inc., Southfield, MI (US); DENSO CORPORATION, Kariya (JP)

(72) Inventors: Robert Wunsche, III, Clarkston, MI (US); Mustafa Mahmoud, Northville, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 562 days.

(21) Appl. No.: 16/677,068

(22) Filed: Nov. 7, 2019

(65) Prior Publication Data

US 2020/0149913 A1   May 14, 2020

Related U.S. Application Data

(60) Provisional application No. 62/812,110, filed on Feb. 28, 2019, provisional application No. 62/760,613, filed on Nov. 13, 2018.

(51) Int. Cl.
   *G01C 21/36* (2006.01)
   *G07C 5/00* (2006.01)
   (Continued)

(52) U.S. Cl.
   CPC ..... *G01C 21/3617* (2013.01); *G01C 21/3438* (2013.01); *G01C 21/3691* (2013.01);
   (Continued)

(58) Field of Classification Search
   CPC ............. G07B 15/02; G01C 21/3617; G01C 21/3438; G01C 21/3691; G01C 21/343;
   (Continued)

(56) References Cited

U.S. PATENT DOCUMENTS 10,423,934 B1 *  9/2019  Zanghi ............ G06Q 10/06398
10,783,725 B1 *  9/2020  Gaudin .................. G07C 5/008
(Continued)

OTHER PUBLICATIONS

International Search Report regarding International Application No. PCT/US2019/061209, dated Feb. 3, 2020.
(Continued)

*Primary Examiner* — Geepy Pe
*Assistant Examiner* — Paulo Roberto Gonzalez Leite
(74) *Attorney, Agent, or Firm* — Harness, Dickey & Pierce, P.L.C.

(57) ABSTRACT

A method and system are disclosed and include assigning a vehicle to a user. The method also includes obtaining contextual information associated with the vehicle-sharing request, and the contextual information includes at least one of location information associated with the vehicle-sharing request, route information associated with the vehicle-sharing request, and user information associated with a vehicle-sharing account corresponding to the user. The method also includes determining a cleanliness score based on the contextual information and determining whether the cleanliness score is less than a first threshold value. The method also includes transmitting, in response to (i) the cleanliness score being less than the first threshold value and (ii) a vehicle-sharing session corresponding to the vehicle-sharing request being complete, an alert that is configured to indicate that the vehicle needs to be cleaned.

18 Claims, 6 Drawing Sheets

(51) Int. Cl.
 G06Q 10/02 (2012.01)
 G06Q 50/30 (2012.01)
 G01C 21/34 (2006.01)

(52) U.S. Cl.
 CPC ............. *G06Q 10/02* (2013.01); *G06Q 50/30* (2013.01); *G07C 5/008* (2013.01)

(58) Field of Classification Search
 CPC ........ G07C 5/008; G06Q 10/02; G06Q 50/30; G06Q 30/0645
 See application file for complete search history.

(56) References Cited

U.S. PATENT DOCUMENTS

| | | | |
|---|---|---|---|
| 11,308,458 B2* | 4/2022 | Derouen | B60W 40/06 |
| 2015/0370253 A1 | 12/2015 | Gurin | |
| 2017/0210353 A1* | 7/2017 | Stauffer | B60Q 9/00 |
| 2018/0308191 A1* | 10/2018 | Matthiesen | G01C 21/3438 |
| 2018/0321050 A1 | 11/2018 | Chase et al. | |
| 2021/0197769 A1* | 7/2021 | Shirakura | B60S 1/56 |

OTHER PUBLICATIONS

Written Opinion regarding International Application No. PCT/US2019/061209, dated Feb. 3, 2020.

* cited by examiner

PREDICTIVE CLEANLINESS FUNCTION FOR VEHICLE-SHARING FLEET

CROSS-REFERENCE TO RELATED APPLICATIONS

This application claims the benefit of U.S. Provisional Application No. 62/760,613, filed on Nov. 13, 2018, and U.S. Provisional Application No. 62/812,110, filed on Feb. 28, 2019. The entire disclosures of each of the above applications are incorporated herein by reference.

FIELD

The present disclosure relates to predictive cleanliness functions for a vehicle-sharing fleet.

BACKGROUND

This section provides background information related to the present disclosure and is not necessarily prior art.

Vehicle-sharing fleet managers may have a variety of vehicles that are available to rent for a predefined period of time, such as an hour, using a vehicle-sharing application. Similarly, ride-hailing and ride-sharing fleet managers may have a variety of vehicles that enable users to request a vehicle in order to travel to a specified destination. However, these vehicles lack sufficient and effective predictive cleanliness analysis systems.

SUMMARY

This section provides a general summary of the disclosure, and this section is not a comprehensive disclosure of its full scope or all of its features.

A method is disclosed and includes assigning, using a processor configured to execute instructions stored in a nontransitory computer-readable medium and in response to receiving a vehicle-sharing request, a vehicle to a user. The method also includes obtaining, using the processor, contextual information associated with the vehicle-sharing request, wherein the contextual information includes at least one of location information associated with the vehicle-sharing request, route information associated with the vehicle-sharing request, and user information associated with a vehicle-sharing account corresponding to the user. The method also includes determining, using the processor, a cleanliness score based on the contextual information; and determining, using the processor, whether the cleanliness score is less than a first threshold value. The method also includes transmitting, using the processor and in response to (i) the cleanliness score being less than the first threshold value and (ii) a vehicle-sharing session corresponding to the vehicle-sharing request being complete, an alert that is configured to indicate that the vehicle needs to be cleaned.

In some embodiments, the contextual information includes weather information associated with the vehicle-sharing request.

In some embodiments, the weather information indicates weather conditions associated with at least one of an originating location of the vehicle-sharing request and a destination of the vehicle-sharing request.

In some embodiments, the location information is associated with at least one of an originating location of the vehicle-sharing request and a destination of the vehicle-sharing request.

In some embodiments, the user information indicates a frequency of prior alerts that were generated for prior vehicle-sharing sessions associated with the user.

In some embodiments, determining the cleanliness score further comprises: determining an interior cleanliness score based on the contextual information and determining an exterior cleanliness score based on the contextual information.

In some embodiments, the method further comprises, in response to the interior cleanliness score being less than a second threshold value and the vehicle-sharing session corresponding to the vehicle-sharing request being complete: transmitting a secondary alert, wherein the secondary alert is configured to enable an operator to activate an interior camera of the vehicle.

In some embodiments, the method further comprises, in response to the exterior cleanliness score being less than a second threshold value and the vehicle-sharing session corresponding to the vehicle-sharing request being complete: transmitting a secondary alert, wherein the secondary alert is configured to enable an operator to activate an exterior camera of the vehicle.

In some embodiments, the contextual information includes cleaning history information associated with the vehicle.

In some embodiments, the cleaning history information represents a most recent cleaning event.

A system is also disclosed and includes a processor configured to execute instructions stored in a nontransitory computer-readable medium. The instructions include, in response to receiving a vehicle-sharing request, assigning a vehicle to a user. The instructions also include obtaining contextual information associated with the vehicle-sharing request, wherein the contextual information includes at least one of location information associated with the vehicle-sharing request, route information associated with the vehicle-sharing request, and user information associated with a vehicle-sharing account corresponding to the user. The instructions also include determining a cleanliness score based on the contextual information and determining whether the cleanliness score is less than a first threshold value. The instructions also include, in response to (i) the cleanliness score being less than the first threshold value and (ii) a vehicle-sharing session corresponding to the vehicle-sharing request being complete, transmitting an alert that is configured to indicate that the vehicle needs to be cleaned.

In some embodiments, the contextual information includes weather information associated with the vehicle-sharing request.

In some embodiments, the weather information indicates weather conditions associated with at least one of an originating location of the vehicle-sharing request and a destination of the vehicle-sharing request.

In some embodiments, the location information is associated with at least one of an originating location of the vehicle-sharing request and a destination of the vehicle-sharing request.

In some embodiments, the user information indicates a frequency of prior alerts that were generated for prior vehicle-sharing sessions associated with the user.

In some embodiments, determining the cleanliness score further comprises: determining an interior cleanliness score based on the contextual information; and determining an exterior cleanliness score based on the contextual information.

In some embodiments, the instructions further include, in response to the interior cleanliness score being less than a second threshold value and the vehicle-sharing session corresponding to the vehicle-sharing request being complete: transmitting a secondary alert, wherein the secondary alert is configured to enable an operator to activate an interior camera of the vehicle.

In some embodiments, the instructions further include, in response to the exterior cleanliness score being less than a second threshold value and the vehicle-sharing session corresponding to the vehicle-sharing request being complete: transmitting a secondary alert, wherein the secondary alert is configured to enable an operator to activate an exterior camera of the vehicle.

In some embodiments, the contextual information includes cleaning history information associated with the vehicle.

In some embodiments, the cleaning history information represents a most recent cleaning event.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

Corresponding reference numerals indicate corresponding parts throughout the several views of the drawings.

DETAILED DESCRIPTION

Figure 1:
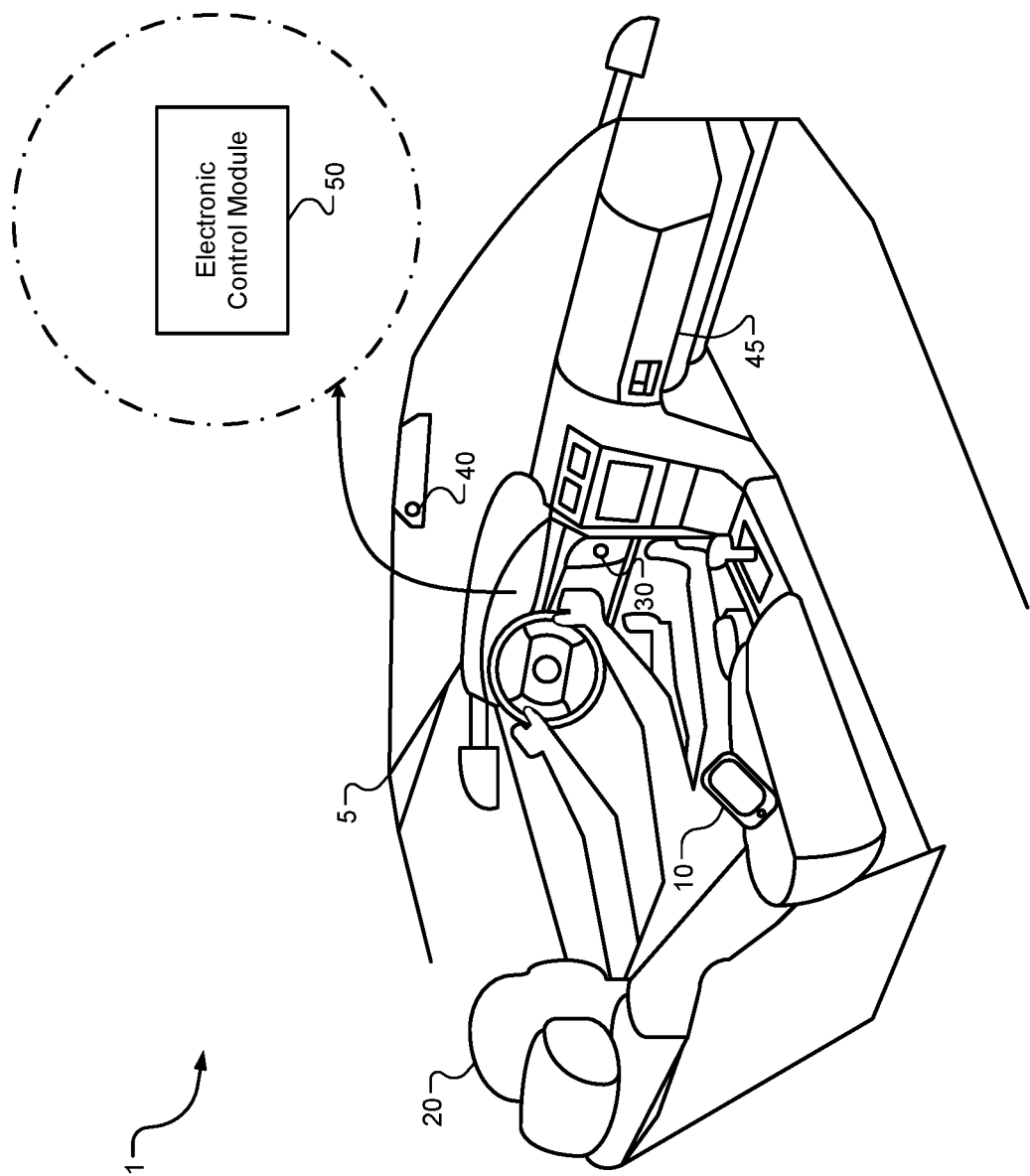
FIGS. 1-4 are example diagrams of a vehicle according to the present disclosure.

Example embodiments will now be described more fully with reference to the accompanying drawings.

With reference to FIGS. 1-4, example illustrations of a system 1 are shown. The system 1 may include a vehicle 5, a portable device 10, an ignition switch 30, an interior camera 40, and a storage compartment 45. In one embodiment, the vehicle 5 is part of a vehicle-sharing fleet. Additionally or alternatively, the vehicle 5 may be part of a ride-sharing fleet and/or a ride-hailing fleet.

The vehicle 5 may include an electronic control module (ECM) 50. As an example, the ECM 50 may be located behind a dashboard of the vehicle 5. While one interior camera 40 is shown in this example, any number of interior cameras 40 can be included within the vehicle 5. Moreover, while the interior camera 40 is located on a rear-view mirror in FIG. 1, the interior camera 40 may be positioned at any suitable location within the interior of the vehicle 5.

The portable device 10 may be any device that is configured to transmit and receive wireless signals, such as a smartphone, smartwatch, wearable electronic device, key fob, tablet device, laptop device, a Bluetooth-enabled device, or other device associated with a user 20 and capable of wireless communication. As described below in further detail, the portable device 10 is configured to generate vehicle-sharing requests and define personalized vehicle settings via an application executing on the portable device 10. Furthermore, the portable device 10 is configured to receive a digital key associated with the vehicle 5 from a fleet manager computing system (shown below) in response to transmitting the vehicle-sharing request. The digital key enables the user 20 to unlock and enter the vehicle 5. Accordingly, the portable device 10 may include at least one processor that is configured to execute instructions stored in a nontransitory computer-readable medium, such as a random-access memory (RAM) and/or a read-only memory (ROM).

The interior camera 40 may be configured to obtain image data of the user 20. Based on the image data obtained by the interior camera 40 and a vehicle-sharing account associated with the user 20, the ECM 50 may be configured to authenticate the user 20. In order to carry out the functionality of algorithms described herein, the ECM 50 may include at least one processor that is configured to execute instructions stored in a nontransitory computer-readable medium, such as a random-access memory (RAM) and/or a read-only memory (ROM). The ECM 50 may be in communication with the interior camera 40 via a hardware link, such as a local interconnect network (LIN) cable, a controller area network (CAN) cable, an Ethernet cable, or any other suitable hardwire link. In other embodiments, the ECM 50 may be in communication with the interior camera 40 via any suitable telemetric link, such as a Bluetooth link (e.g., Bluetooth low-energy), a Wi-Fi or Wi-Fi direct link, a cellular link, etc. Likewise, the ECM 50 may be in communication with the portable device 10 via any suitable telemetric link, such as a Bluetooth link (e.g., Bluetooth low-energy), a Wi-Fi or Wi-Fi direct link, a cellular/LTE link, etc.

In response to the ECM 50 authenticating the user 20, the ECM 50 may enable the user 20 to activate the vehicle 5. As an example, the ECM 50 may enable the user 20 to retrieve keys stored in the storage compartment 45 (e.g., glove box) of the vehicle 5 for subsequent placement and rotation of the ignition switch 30. Alternatively, the ignition switch 30 may be implemented by a button, and as such, the vehicle 5 may be activated in response to pressing the button and the portable device 10 being located within an activation range of the vehicle 5. Additionally, in response to the ECM 50 authenticating the user 20, the ECM 50 may adjust various vehicle settings according to the vehicle-sharing account associated with the user 20.

Figure 2:
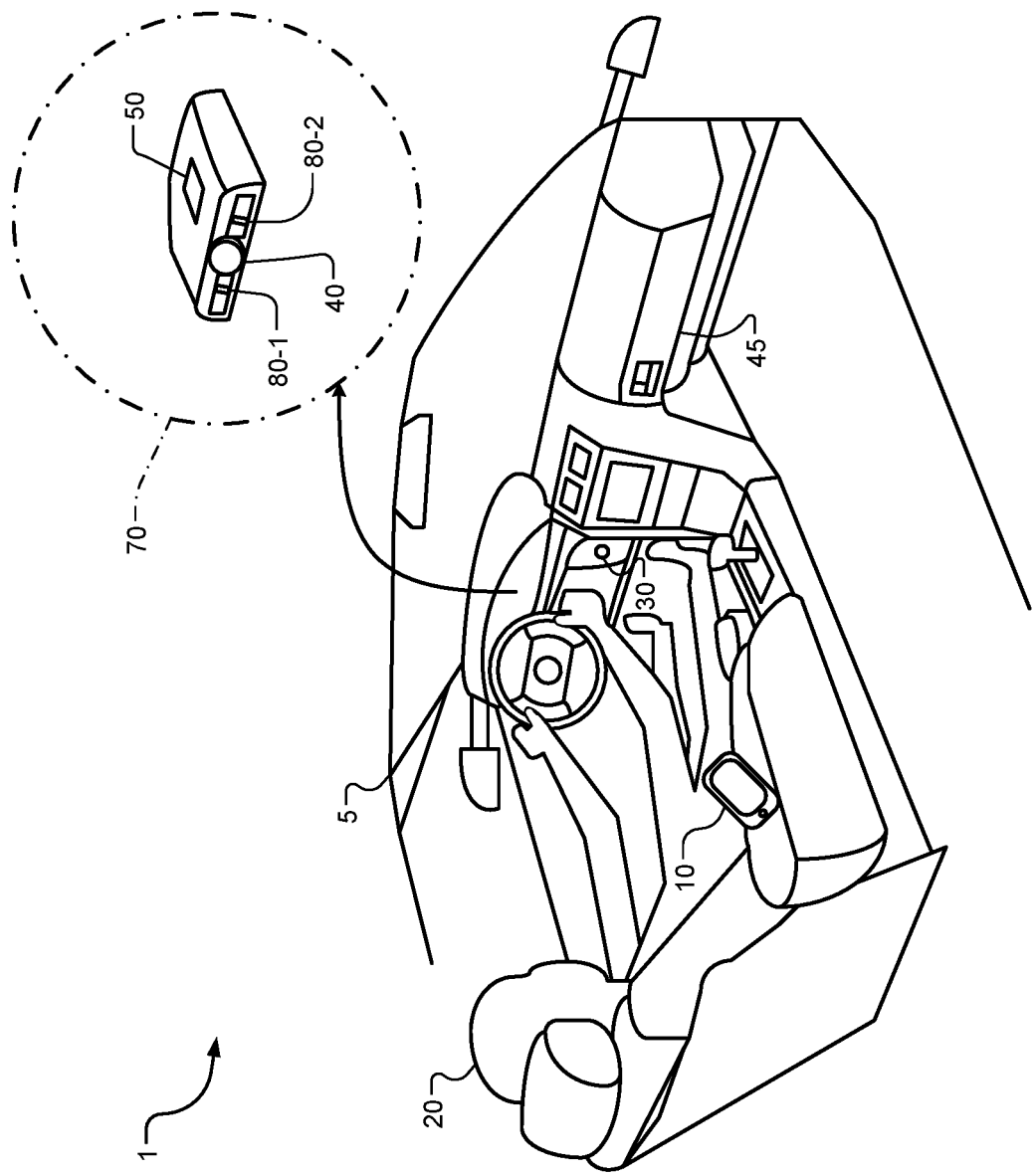

In other embodiments and as shown in FIG. 2, the dashboard may also include a driver status monitor (DSM) 70, which may be mounted over a steering column connected to the steering wheel of the vehicle 5. The DSM 70 may include infrared (IR) sensors 80-1, 80-2 (collectively referred to as IR sensors 80), the interior camera 40, and the ECM 50. The DSM 70 may be configured to obtain facial feature data of the user 20. As an example, the ECM 50 may obtain facial feature data sensed by the IR sensors 80 and the interior camera 40, including images of the face and head of the user 20. Based on the facial feature data, the ECM 50 is configured to, for example, perform a variety of image processing and/or computer vision techniques for facial recognition, as understood by one of ordinary skill in the art.

While the embodiments shown in FIGS. 1-2 include one interior camera 40, in other embodiments, any number of interior cameras 40 may be included within the vehicle 5. Moreover, while the interior camera 40 is included on a rear-view mirror in FIG. 1 and the DSM 70 in FIG. 2, the interior camera 40 may be positioned at any suitable location of the interior of the vehicle 5.

Figure 3:
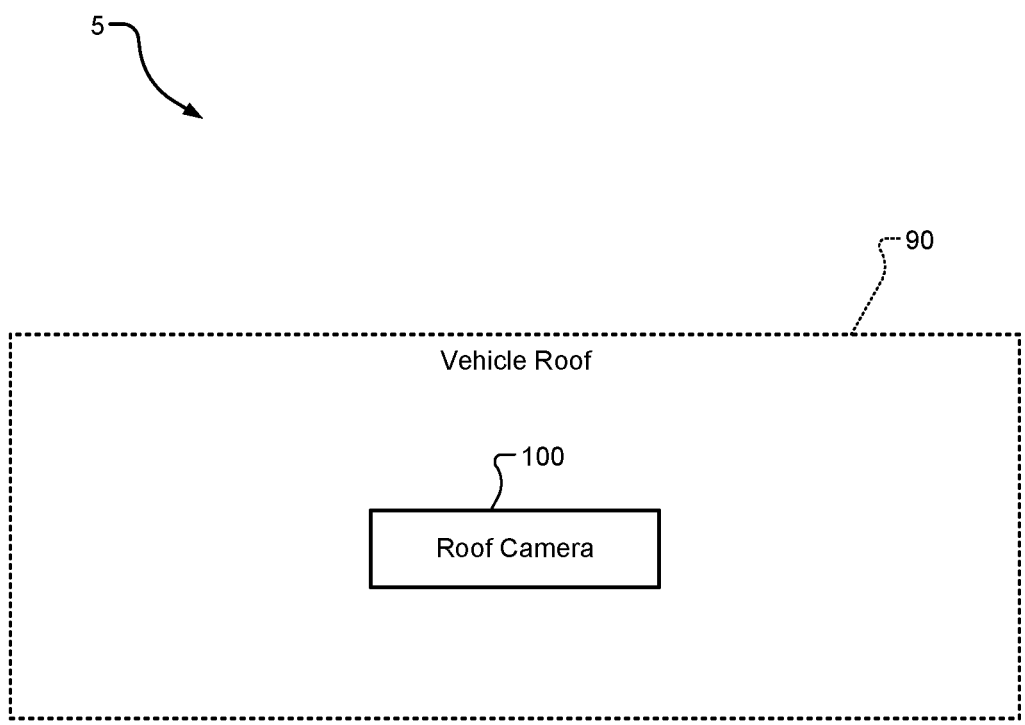

Additionally, a vehicle roof 90 (e.g., a headliner) of the vehicle 5 may include a roof camera value of 100, as shown in FIG. 3. While this embodiment illustrates one roof camera value of 100, in other embodiments, any number of roof cameras 100 may be included on the vehicle roof 90. The roof camera value of 100 is configured to obtain image data representing the interior of the vehicle 5. The ECM 50 may be in communication with the roof camera value of 100 via a hardware link, such as a LIN cable, an Ethernet cable, or any other suitable hardwire link. In other embodiments, the ECM 50 may be in communication with the roof camera value of 100 via any suitable telemetric link, such as a Bluetooth link (e.g., Bluetooth low-energy), a Wi-Fi or Wi-Fi direct link, a cellular link, etc.

Figure 4:
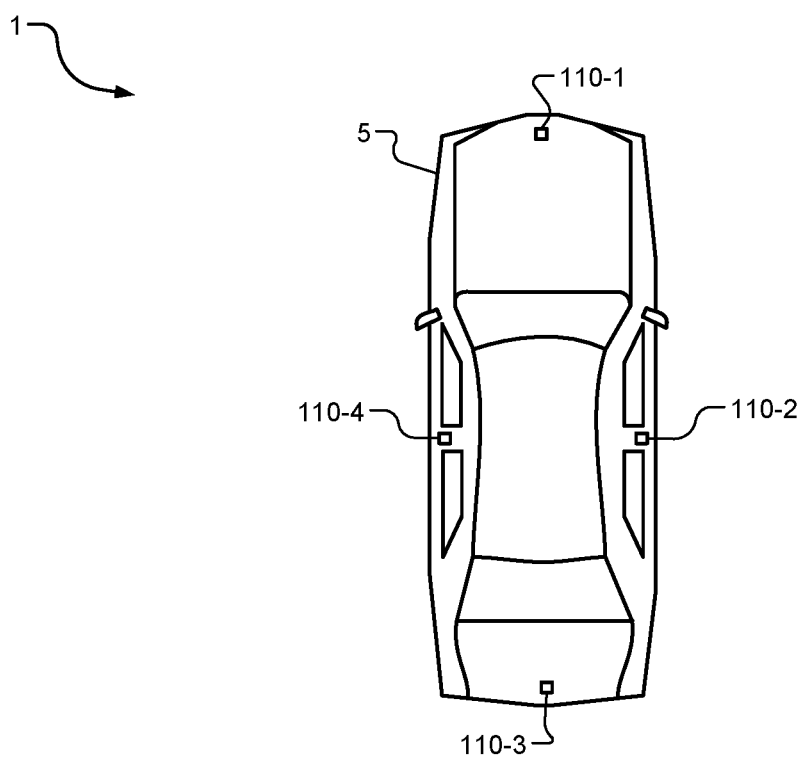

Additionally, the vehicle 5 may include a plurality of exterior cameras 110-1, 110-2, 110-3, 110-4 (collectively referred to as exterior cameras 110), as shown in FIG. 4. While this embodiment illustrates four exterior cameras 110, in other embodiments, the vehicle 5 may include any number of exterior cameras 110, and the exterior cameras 110 may be located at any suitable location on an exterior of the vehicle 5. The ECM 50 may be in communication with the exterior cameras 110 via a hardware link, such as a LIN cable, a CAN cable, an Ethernet cable, or any other suitable hardwire link. In other embodiments, the ECM 50 may be in communication with the exterior cameras 110 via any suitable telemetric link, such as a Bluetooth link (e.g., Bluetooth low-energy), a Wi-Fi or Wi-Fi direct link, a cellular link, etc.

Figure 5:
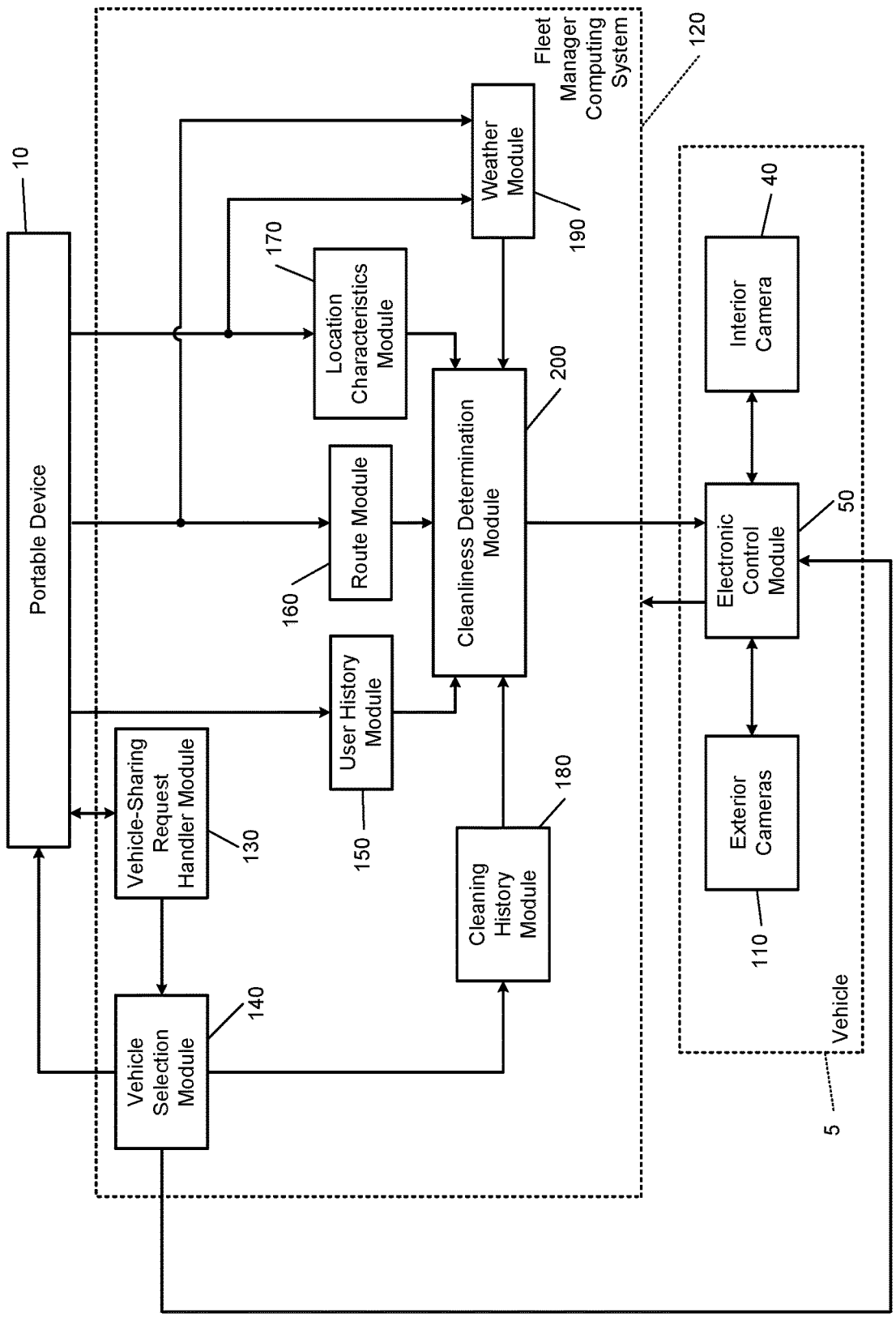
FIG. 5 illustrates a detailed example functional block diagram of a fleet manager computing system according to the present disclosure.

With reference to FIG. 5, a detailed illustration of a fleet manager computing system (FMCS) 120 is shown. The FMCS 120 may include a vehicle-sharing request handler module 130, a vehicle selection module 140, a user history module 150, a route module 160, a location characteristics module 170, a cleaning history module 180, a weather module 190, and a cleanliness determination module (CDM) 200. The modules of the FMCS 120 may be implemented by one or more processors that are configured to execute instructions stored in a non-transitory computer-readable medium, such as a RAM and/or ROM.

In one embodiment, the vehicle-sharing request handler module 130 is configured to receive a vehicle-sharing request from the portable device 10. In response to receiving the vehicle-sharing request, the vehicle-sharing request handler module 130 instructs the vehicle selection module 140 to identify and assign one of the vehicles of the vehicle-sharing fleet (i.e., vehicle 5) to the user 20. The vehicle selection module 140 may identify one of the vehicles based on information included in the vehicle-sharing request, such as a size and/or occupancy of the vehicle, a fuel efficiency of the vehicle, and a type of vehicle. In response to identifying, for example, vehicle 5, the vehicle selection module 140 is configured to assign vehicle 5 to the user 20 and transmit the digital key associated with vehicle 5 to the portable device 10.

Once the vehicle 5 is assigned to the user 20, the user history module 150 is configured to obtain user profile history information associated with the user's vehicle-sharing profile. As an example, the user profile history information may include information indicating an overall user cleaning frequency (e.g., 15% of all the user's prior vehicle-sharing sessions required a subsequent cleaning); a recent cleaning frequency (e.g., 7% of the user's last one hundred vehicle-sharing sessions required a subsequent cleaning); and a user flagging frequency (e.g., 28% of all the user's prior vehicle-sharing sessions generated a critical flag and/or a cautionary flag, which are described below in further detail with reference to FIG. 6).

Additionally, once the vehicle 5 is assigned to the user 20, the route module 160 is configured to obtain route information associated with the vehicle-sharing request. As an example, the route information may include information indicating an originating location of the user 20 and/or the vehicle 5, a destination associated with the vehicle-sharing request, navigation instructions based on the originating location and the destination, and road conditions associated with the navigation instructions. The navigation instructions may be obtained by a mapping application being executed by the FMCS 120, the ECM 50, and/or the portable device 10. The road conditions may indicate a type of road that the vehicle 5 will use to arrive at the destination (e.g., a dirt road, a paved road, etc.)

Likewise, once the vehicle 5 is assigned to the user 20, the location characteristics module 170 is configured to generate characteristic information associated with the originating location of the user 20 and/or the vehicle 5 and the destination associated with the vehicle-sharing request. As an example, the characteristic information may describe a location type associated with the originating location and/or the destination (e.g., a residential building, an industrial building, a fast-food restaurant, etc.). As another example, the characteristic information may describe landform features associated with the originating location and/or the destination (e.g., the location is one of a beach, a sand dune, a hill, a mountain, a canyon, etc.).

Additionally, once the vehicle 5 is assigned to the user 20, the cleaning history module 180 is configured to obtain cleaning history information associated with the selected vehicle (i.e., vehicle 5). As an example, the vehicle cleaning history information may include information indicating a most recent cleaning (e.g., the interior of the vehicle 5 was cleaned five days ago, and the exterior of the vehicle was cleaned 20 days ago); an overall vehicle cleaning frequency (e.g., 45% of all prior vehicle-sharing sessions required a subsequent cleaning); and a vehicle flagging frequency (e.g., 60% of all prior vehicle-sharing sessions generated a critical flag and/or a cautionary flag).

The weather module 190 is configured to generate weather information based on the location information and the route information associated with the vehicle-sharing request. As an example, the weather module 190 may obtain weather information associated with the originating location, the destination, and/or the navigation instructions (e.g., the weather module 190 determines that (i) it is raining at the destination; (ii) the location associated with the user 20 was exposed to heavy rainfall for a period of time prior to making the vehicle-sharing request; (iii) the navigation instructions indicate that the vehicle 5 will briefly pass through a hailstorm prior to arriving at the destination, etc.). The weather information may be obtained using a weather application that is executed by the FMCS 120 or the portable device 10.

Based on the user profile history information, the route information, the characteristic information, the cleaning history information, and/or the weather information, the CDM 200 is configured to generate a cleanliness score. The cleanliness score is representative of the cleanliness of the interior and/or exterior of the vehicle 5. As an example, a higher cleanliness score may indicate that the vehicle 5 is clean, while a lower cleanliness score may indicate that the vehicle 5 is dirty. Furthermore, the CDM 200 may be configured to generate an interior cleanliness score associated with a cleanliness of the interior of the vehicle 5, and the CDM 200 may generate an exterior cleanliness score associated with a cleanliness of the exterior of the vehicle 5. If one of the cleanliness scores is above a threshold value, the CDM 200 may generate the critical flag and/or the cautionary flag, which are described below in further detail with reference to FIG. 6.

In one embodiment, the CDM 200 may generate, for at least one of the interior and the exterior of the vehicle 5, a first numerical value based on the user profile history information. As an example, the first numerical value may have a range of 0-1, wherein a value of 1 is associated with an overall user cleaning frequency of less than 10%, a value of 0.9 is associated with an overall user cleaning frequency between 11% and 20%, etc. Additionally, the first numerical value may be based on or adjusted by the recent cleaning frequency and/or the user flagging history (e.g., add 0.1 to the first numerical value if the recent cleaning frequency and/or the user flagging history are below a threshold value).

Similarly, the CDM 200 may generate, for at least one of the interior and the exterior of the vehicle 5, a second numerical value based on the route information. As an example, if the navigation instructions instruct the user 20 to travel along a dirt road, the CDM 200 generates a value of 0; otherwise, the CDM 200 generates a value of 1. Furthermore, the CDM 200 may generate, for at least one of the interior and the exterior of the vehicle 5, a third numerical value based on the characteristic information. As an example, if the destination is associated with a beach, a fast-food restaurant, or other location that are likely to make the vehicle 5 dirty, then the CDM 200 generates a value of 0; otherwise, the CDM 200 may generate other values that correspond to the likelihood of the vehicle 5 becoming dirty once the vehicle-sharing session ends.

In addition, the CDM 200 may generate, for at least one of the interior and the exterior of the vehicle 5, a fourth numerical value based on the cleaning history information. As an example, the fourth numerical value may have a range of 0-1, wherein a value of 1 is associated with a more recent cleaning of either the interior or the exterior of the vehicle 5, while a value of 0 is associated with a less recent cleaning. Likewise, the CDM 200 may generate, for at least one of the interior and the exterior of the vehicle 5, a fifth numerical value based on the weather information. As an example, the fifth numerical value may have a range of 0-1, wherein a value of 1 is associated with at least one of the location, destination, and route being associated with, for example, warm and sunny weather. On the other hand, a value of 0 may be associated with rain, snow, hail, thunderstorms, wind, and/or cold weather conditions.

The CDM 200 may sum the respective numerical scores in order to generate the interior and exterior cleanliness scores. If one of the cleanliness scores is less than a threshold value, the CDM 200 may generate the critical flag and/or the cautionary flag, as described below in further detail with reference to FIG. 6.

While the above embodiment discloses generating a cleanliness score based on a sum of five numerical values, any suitable arithmetic operation for generating the cleanliness score may be implemented. Furthermore, while the above embodiment illustrates each of the five numerical values having equal weights, in other embodiments, certain numerical values may be weighted and/or prioritized in order to generate the cleanliness scores.

Figure 6:
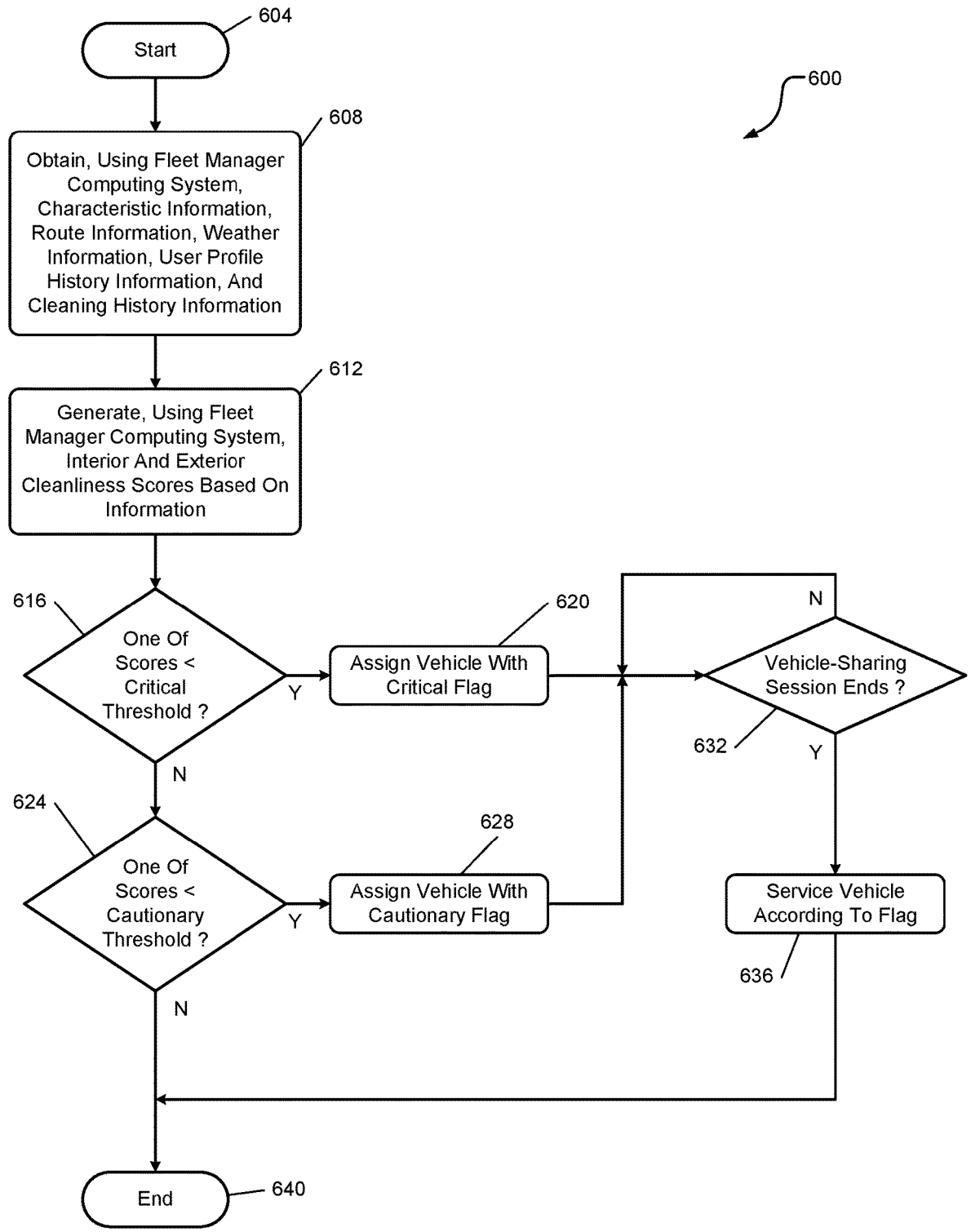
FIG. 6 illustrates an example control algorithm according to the present disclosure.

With reference to FIG. 6, a flowchart illustrating an example control algorithm 600 is shown. The control algorithm 600 begins at 604 when, for example, the vehicle 5 from the vehicle-sharing fleet is assigned to the user 20. At 608, the control algorithm 600 obtains, using the FMCS 120, the user profile history information, the route information, the characteristic information, the cleaning history information, and the weather information. At 612, the control algorithm generates, using the FMCS 120, an interior cleanliness score and an exterior score based on the user profile history information, the route information, the characteristic information, the cleaning history information, and/or the weather information.

At 616, the control algorithm 600 determines, using the FMCS 120, whether the interior cleanliness score or the exterior cleanliness score is less than a critical threshold value. If so, the control algorithm 600 proceeds to 620; otherwise, the control algorithm 600 proceeds to 624. At 620, the control algorithm 600 assigns, using the FMCS 120, the vehicle 5 with a critical flag and then proceeds to 632.

At 624, the control algorithm 600 determines, using the FMCS 120, whether the interior cleanliness score or the exterior cleanliness score is less than a cautionary threshold value. If so, the control algorithm 600 proceeds to 628; otherwise, the control algorithm 600 proceeds to 640. At 628, the control algorithm 600 assigns, using the FMCS 120, the vehicle 5 with a cautionary flag and then proceeds to 632.

At 632, the control algorithm 600 determines whether the vehicle-sharing session ends. If so, the control algorithm 600 proceeds to 636; otherwise, the control algorithm 600 remains at 632 until the vehicle-sharing session ends. At 636, the control algorithm 600 services the vehicle 5 according to the flag. As an example, if the vehicle 5 was assigned with a cautionary flag, the FMCS 120 may instruct an operator of the FMCS 120 that the vehicle 5 may be dirty. Moreover, the operator may subsequently activate at least one of the interior camera 40 and the exterior camera 110 in order to remotely inspect the vehicle 5 and determine whether the vehicle 5 needs to be cleaned prior to any future vehicle-sharing sessions. As another example, if the vehicle 5 was assigned with the critical flag, the FMCS 120 may designate the vehicle 5 as one that needs to be cleaned prior to any future vehicle-sharing sessions. Moreover, the FMCS 120 may prevent the vehicle selection module 140 from assigning a vehicle to a user until the vehicle 5 is clean. At 640, the control algorithm 600 ends.

The present disclosure provides a method that includes assigning, using a processor configured to execute instructions stored in a nontransitory computer-readable medium and in response to receiving a vehicle-sharing request, a vehicle to a user, obtaining, using the processor, contextual information associated with the vehicle-sharing request, wherein the contextual information includes at least one of location information associated with the vehicle-sharing request, route information associated with the vehicle-sharing request, and user information associated with a vehicle-sharing account corresponding to the user, determining, using the processor, a cleanliness score based on the contextual information, determining, using the processor, whether the cleanliness score is less than a first threshold value, and transmitting, using the processor and in response to (i) the cleanliness score being less than the first threshold value and (ii) a vehicle-sharing session corresponding to the vehicle-sharing request being complete, an alert that is configured to indicate that the vehicle needs to be cleaned.

In other features, the contextual information includes weather information associated with the vehicle-sharing request.

In other features, the weather information indicates weather conditions associated with at least one of an originating location of the vehicle-sharing request and a destination of the vehicle-sharing request.

In other features, the location information is associated with at least one of an originating location of the vehicle-sharing request and a destination of the vehicle-sharing request.

In other features, the user information indicates a frequency of prior alerts that were generated for prior vehicle-sharing sessions associated with the user.

In other features, determining the cleanliness score further includes determining an interior cleanliness score based on the contextual information and determining an exterior cleanliness score based on the contextual information.

In other features, the method further includes, in response to the interior cleanliness score being less than a second threshold value and the vehicle-sharing session corresponding to the vehicle-sharing request being complete, transmitting a secondary alert, wherein the secondary alert is configured to enable an operator to activate an interior camera of the vehicle.

In other features, the method further includes, in response to the exterior cleanliness score being less than a second threshold value and the vehicle-sharing session corresponding to the vehicle-sharing request being complete, transmitting a secondary alert, wherein the secondary alert is configured to enable an operator to activate an exterior camera of the vehicle.

In other features, the contextual information includes cleaning history information associated with the vehicle.

In other features, the cleaning history information represents a most recent cleaning event.

The present disclosure also provides a system that includes a processor configured to execute instructions stored in a nontransitory computer-readable medium. The instructions include, in response to receiving a vehicle-sharing request, assigning a vehicle to a user, obtaining contextual information associated with the vehicle-sharing request, wherein the contextual information includes at least one of location information associated with the vehicle-sharing request, route information associated with the vehicle-sharing request, and user information associated with a vehicle-sharing account corresponding to the user, determining a cleanliness score based on the contextual information, determining whether the cleanliness score is less than a first threshold value, and, in response to (i) the cleanliness score being less than the first threshold value and (ii) a vehicle-sharing session corresponding to the vehicle-sharing request being complete, transmitting an alert that is configured to indicate that the vehicle needs to be cleaned.

In other features, the contextual information includes weather information associated with the vehicle-sharing request.

In other features, the weather information indicates weather conditions associated with at least one of an originating location of the vehicle-sharing request and a destination of the vehicle-sharing request.

In other features, the location information is associated with at least one of an originating location of the vehicle-sharing request and a destination of the vehicle-sharing request.

In other features, the user information indicates a frequency of prior alerts that were generated for prior vehicle-sharing sessions associated with the user.

In other features, determining the cleanliness score further includes determining an interior cleanliness score based on the contextual information and determining an exterior cleanliness score based on the contextual information.

In other features, the instructions further include, in response to the interior cleanliness score being less than a second threshold value and the vehicle-sharing session corresponding to the vehicle-sharing request being complete, transmitting a secondary alert, wherein the secondary alert is configured to enable an operator to activate an interior camera of the vehicle.

In other features, the instructions further include, in response to the exterior cleanliness score being less than a second threshold value and the vehicle-sharing session corresponding to the vehicle-sharing request being complete, transmitting a secondary alert, wherein the secondary alert is configured to enable an operator to activate an exterior camera of the vehicle.

In other features, the contextual information includes cleaning history information associated with the vehicle.

In other features, the cleaning history information represents a most recent cleaning event.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
assigning, using a processor configured to execute instructions stored in a nontransitory computer-readable medium and in response to receiving a vehicle-sharing request, a vehicle to a user;
obtaining, using the processor, contextual information associated with the vehicle-sharing request, wherein the contextual information includes location information including a destination associated with the vehicle-sharing request and route information corresponding to a route traveled by the vehicle to the destination associated with the vehicle-sharing request;
generating, using the processor, a first numerical value based on the route information, the first numerical value corresponding to whether the route traveled by the vehicle includes a dirt road;
generating, using the processor, a second numerical value based on characteristic information associated with the destination, the second numerical value corresponding to a likelihood of the vehicle becoming dirtier at the destination after a vehicle-sharing session corresponding to the vehicle-sharing request is completed;
calculating, using the processor, a cleanliness score based on the first and second numerical values;
comparing, using the processor, the cleanliness score with a first threshold value;
determining, using the processor, whether the vehicle needs to be cleaned based on the comparison of the cleanliness score with the first threshold value; and in response to determining that the vehicle needs to be cleaned after the vehicle-sharing request is completed, transmitting, using the processor an alert indicating that the vehicle needs to be cleaned.

2. The method of claim 1, wherein the contextual information includes weather information associated with the vehicle-sharing request, and the cleanliness score is additionally determined based on the weather information.

3. The method of claim 2, wherein the weather information indicates weather conditions associated with at least one of an originating location of the vehicle-sharing request and a destination of the vehicle-sharing request.

4. The method of claim 1, wherein the location information additionally includes an originating location of the vehicle-sharing request and the cleanliness score is additionally determined based on the originating location.

5. The method of claim 1, wherein determining the cleanliness score further comprises:
  determining an interior cleanliness score based on the contextual information; and
  determining an exterior cleanliness score based on the contextual information.

6. The method of claim 5, wherein the method further comprises, in response to the interior cleanliness score being less than a second threshold value and the vehicle-sharing session corresponding to the vehicle-sharing request being complete:
  transmitting a secondary alert, wherein the secondary alert is configured to enable an operator to activate an interior camera of the vehicle.

7. The method of claim 5, wherein the method further comprises, in response to the exterior cleanliness score being less than a second threshold value and the vehicle-sharing session corresponding to the vehicle-sharing request being complete:
  transmitting a secondary alert, wherein the secondary alert is configured to enable an operator to activate an exterior camera of the vehicle.

8. The method of claim 1, wherein the contextual information includes cleaning history information associated with the vehicle and the cleanliness is additionally determined based on the cleaning history information.

9. The method of claim 8, wherein the cleaning history information represents a most recent cleaning event.

10. A system comprising:
  a processor configured to execute instructions stored in a nontransitory computer-readable medium, wherein the instructions include:
    in response to receiving a vehicle-sharing request, assigning a vehicle to a user;
    obtaining contextual information associated with the vehicle-sharing request, wherein the contextual information includes location information including a destination associated with the vehicle-sharing request and route information corresponding to a route traveled by the vehicle to the destination associated with the vehicle-sharing request;
    generating a first numerical value based on the route information, the first numerical value corresponding to whether the route traveled by the vehicle includes a dirt road;
    generating a second numerical value based on characteristic information associated with the destination, the second numerical value corresponding to a likelihood of the vehicle becoming dirtier at the destination after a vehicle-sharing session corresponding to the vehicle-sharing request is completed;
    calculating a cleanliness score based on the first and second numerical values;
    comparing the cleanliness score with a first threshold value;
    determining, using the processor, whether the vehicle needs to be cleaned based on the comparison of the cleanliness score with the first threshold value; and
    in response to determining that the vehicle needs to be cleaned after the vehicle-sharing request is completed, transmitting an alert indicating that the vehicle needs to be cleaned.

11. The system of claim 10, wherein the contextual information includes weather information associated with the vehicle-sharing request, and the cleanliness score is additionally determined based on the weather information.

12. The system of claim 11, wherein the weather information indicates weather conditions associated with at least one of an originating location of the vehicle-sharing request and a destination of the vehicle-sharing request.

13. The system of claim 10, wherein the location information additionally includes an originating location of the vehicle-sharing request and the cleanliness score is additionally determined based on the originating location.

14. The system of claim 10, wherein determining the cleanliness score further comprises:
  determining an interior cleanliness score based on the contextual information; and
  determining an exterior cleanliness score based on the contextual information.

15. The system of claim 14, wherein the instructions further include, in response to the interior cleanliness score being less than a second threshold value and the vehicle-sharing session corresponding to the vehicle-sharing request being complete:
  transmitting a secondary alert, wherein the secondary alert is configured to enable an operator to activate an interior camera of the vehicle.

16. The system of claim 14, wherein the instructions further include, in response to the exterior cleanliness score being less than a second threshold value and the vehicle-sharing session corresponding to the vehicle-sharing request being complete:
  transmitting a secondary alert, wherein the secondary alert is configured to enable an operator to activate an exterior camera of the vehicle.

17. The system of claim 10, wherein the contextual information includes cleaning history information associated with the vehicle and the cleanliness is additionally determined based on the cleaning history information.

18. The system of claim 17, wherein the cleaning history information represents a most recent cleaning event.

* * * * *